United States Patent
Park et al.

(10) Patent No.: US 10,172,061 B2
(45) Date of Patent: *Jan. 1, 2019

(54) METHOD AND APPARATUS FOR TRANSMITTING CELL SHAPING INDICATION IN WIRELESS COMMUNICATION SYSTEM

(71) Applicant: LG ELECTRONICS INC., Seoul (KR)

(72) Inventors: Kyungmin Park, Seoul (KR); Insun Lee, Seoul (KR); Daewook Byun, Seoul (KR); Jian Xu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,472

(22) Filed: Aug. 2, 2017

(65) Prior Publication Data

US 2017/0367021 A1   Dec. 21, 2017

Related U.S. Application Data

(63) Continuation of application No. 14/909,564, filed as application No. PCT/KR2014/007351 on Aug. 8, 2014, now Pat. No. 9,756,537.

(Continued)

(51) Int. Cl.
*H04W 36/00* (2009.01)
*H04W 36/16* (2009.01)
(Continued)

(52) U.S. Cl.
CPC .......... *H04W 36/16* (2013.01); *H04W 16/08* (2013.01); *H04W 16/18* (2013.01)

(58) Field of Classification Search
CPC ..... H04W 36/30; H04W 36/18; H04W 36/08; H04W 36/14; H04W 36/12
See application file for complete search history.

(56) References Cited

U.S. PATENT DOCUMENTS

| 7,162,250 | B2 | 1/2007 | Misra |
| 8,903,413 | B2 * | 12/2014 | Ji ........................ H04W 36/08 455/453 |

(Continued)

FOREIGN PATENT DOCUMENTS

| JP | 2011-244389 A | 12/2011 |
| WO | 2011-046150 A1 | 4/2011 |
| WO | 2012-148410 A1 | 11/2012 |

OTHER PUBLICATIONS

R3-130827: 3GPP TSG RAN WG3 Meeting #80, Fukuoka, Japan, May 20-24, 2013, CATT "Solutions for failures incurred by AAS," pp. 1-3.

(Continued)

*Primary Examiner* — Moustapha Diaby
(74) *Attorney, Agent, or Firm* — Dentons US LLP

(57) ABSTRACT

A method and apparatus for transmitting a cell shaping/un-shaping indication in a wireless communication system is provided. A first eNodeB (eNB) transmits a cell shaping/un-shaping indication which indicates cell shaping/un-shaping of a cell, managed by the first eNB, in an active antenna system (AAS) to a second eNB. The cell shaping means that main coverage of the cell is maintained unchanged but an edge of the cell can be adapted to load demand. The cell un-shaping means that coverage of the cell goes back to original coverage.

8 Claims, 15 Drawing Sheets

Related U.S. Application Data

(60) Provisional application No. 61/863,921, filed on Aug. 9, 2013.

(51) Int. Cl.
  *H04W 16/08* (2009.01)
  *H04W 16/18* (2009.01)

(56) References Cited

U.S. PATENT DOCUMENTS

| | | | | |
|---|---|---|---|---|
| 2008/0057933 | A1* | 3/2008 | Brunner | H04W 16/06 |
| | | | | 455/422.1 |
| 2010/0278038 | A1* | 11/2010 | Stahle | H04W 24/04 |
| | | | | 370/216 |
| 2012/0163238 | A1* | 6/2012 | Gunnarsson | H04W 16/08 |
| | | | | 370/254 |
| 2012/0252458 | A1 | 10/2012 | Ohnishi | |
| 2012/0276901 | A1* | 11/2012 | Kruglick | H04W 36/0083 |
| | | | | 455/436 |
| 2013/0035101 | A1 | 2/2013 | Wang et al. | |
| 2015/0011215 | A1* | 1/2015 | Uemura | H04W 72/042 |
| | | | | 455/436 |
| 2016/0150456 | A1* | 5/2016 | Wu | H04W 36/0016 |
| | | | | 370/331 |

OTHER PUBLICATIONS

R3-130719: 3GPP TSG-RAN WG3 #79bis, Chicago, USA, Apr. 15-19, 2013, Ericsson, "SON for AAS: Scenerios and Solutions," pp. 1-4.

R3-130889: 3GPP TSG-RAN WG3 #80, Fukuoka, Japan, May 20-24, 2013, Huawei, "Using AAS for cell splitting," pp. 1-4.

R3-130048: 3GPP TSG RAN WG3 Meeting #79, Malta, Jan. 28-Feb. 1, 2013, CATT, "Some considerations on SON for AAS," pp. 1-3.

R3-130472: 3GPP TSG RAN WG3 Meeting #79bis, Chicago, USA, Apr. 15-19, 2013, CATT, "Impact of AAS on network performance," pp. 1-2.

R3-130860: 3GPP TSG-RAN WG3 Meeting #80, May 20-24, 2013, Fukuoka, Japan, Fujitsu, "Analysis on possible issues in AAS operation," pp. 1-3.

\* cited by examiner

FIG. 3
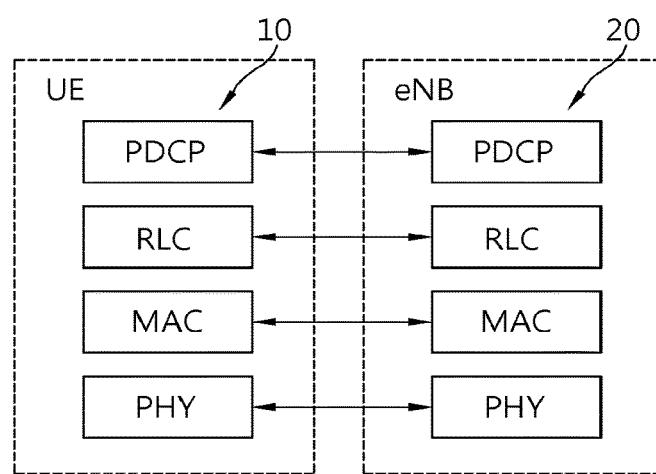
(a)
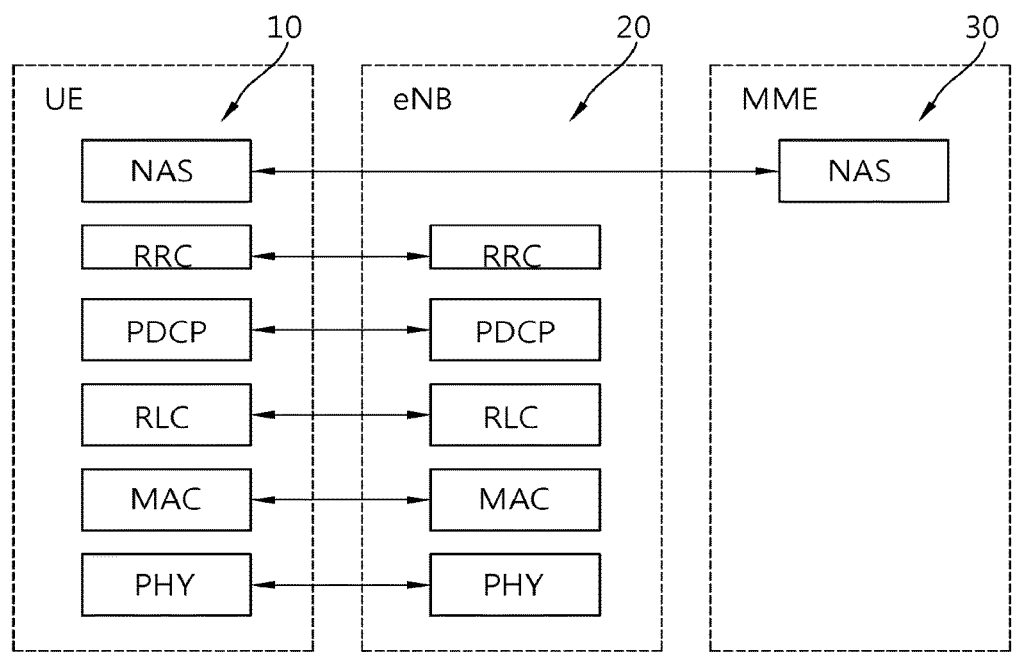
(b)

METHOD AND APPARATUS FOR TRANSMITTING CELL SHAPING INDICATION IN WIRELESS COMMUNICATION SYSTEM

This application is a continuation of U.S. patent application Ser. No. 14/909,564 filed on Feb. 2, 2016, which is a National Stage Entry of International Application No. PCT/KR2014/007351 filed on Aug. 8, 2014, which claims priority to U.S. Provisional Application No. 61/863,921, filed on Aug. 9, 2013, all of which are incorporated by reference in their entirety herein.

BACKGROUND OF THE INVENTION

Field of the Invention

The present invention relates to wireless communications, and more particularly, to a method and apparatus for transmitting a cell shaping indication in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio hearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack and a control plane protocol stack of an LTE system. FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may he advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−*Rx*Pilot+*UL*Interference+Offset+*SNR*Required

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

Self-organizing networks (SON) enhancements are necessary for the interoperability of the existing features as well as for the new features and new deployments considered in 3GP LTE rel-12. In 3GPP LTE rel-11, mobility robustness optimization (MRO) has been enhanced to identify for which UE type the failure has occurred. Other SON use cases might require similar enhancements. For example, mobility load balancing (MLB) is not able to distinguish between UEs that support cell range expansion (CRE) and non-CRE UEs.

Active antennas allow the creation of multiple vertical and horizontal beams making the deployment dynamic. That enables dynamic cell splitting/merging to handle changing load conditions. For example, beams may be steered to distribute capacity precisely according to actual traffic mix, traffic location and user demands. That makes active antennas particularly good for suburban and rural areas, where fixed deployment of pico cells is expensive, but the network may face congestion situations nonetheless. SON can automate the network deployment based on active antennas.

SON enhancements and new features for the deployments based on active antenna system (AAS) have been discussed. Possible deployment scenarios of an AAS, and additionally required SON features for the AAS needs to be discussed.

SUMMARY OF THE INVENTION

The present invention provides a method and apparatus for transmitting a cell shaping indication in a wireless communication system. The present invention provides a method for notifying neighbor eNodeBs (eNBs) of a plan of cell shaping or cell un-shaping, or an event that its cells have completed the cell shaping or the cell un-shaping.

In an aspect, a method for transmitting, by a first eNodeB (eNB), a cell shaping indication in a wireless communication system is provided. The method includes transmitting a cell shaping indication which indicates cell shaping of a cell, managed by the first eNB, in an active antenna system (AAS) to a second eNB. The cell shaping means that main coverage of the cell is maintained unchanged but an edge of the cell can be adapted to load demand.

The cell shaping indication may indicate that the cell shaping of the cell has been completed. The method may further include performing the cell shaping of the cell before transmitting the cell shaping indication to the second eNB.

The cell shaping indication may indicate that the cell shaping of the cell will be performed. The method may further include performing the cell shaping of the cell after transmitting the cell shaping indication to the second eNB.

In another aspect, a method for transmitting, by a first eNodeB (eNB), a cell un-shaping indication in a wireless communication system is provided. The method includes transmitting a cell un-shaping indication which indicates cell un-shaping of a cell, managed by the first eNB, in an active antenna system (AAS) to a second eNB. The cell un-shaping means that coverage of the cell goes back to original coverage.

The cell un-shaping indication may indicate that the cell un-shaping of the cell has been completed. The method may further include performing the cell un-shaping of the cell before transmitting the cell un-shaping indication to the second eNB.

The cell un-shaping indication may indicate that the cell un-shaping of the cell will be performed. The method may further include performing the cell un-shaping of the cell after transmitting the cell un-shaping indication to the second eNB.

In another aspect, a method for rejecting, by a first eNodeB (eNB), a handover procedure in a wireless communication system is provided. The method includes determining to perform cell un-shaping of a cell managed by the first eNB, wherein the cell un-shaping means that that coverage of the cell goes back to original coverage, receiving a handover request message from a second eNB right after determining to perform the cell un-shaping of the cell, and transmitting a handover preparation failure message including cause information, which indicates the cell un-shaping of the cell.

Cell shaping or cell un-shaping can be notified to neighbor eNBs.

BRIEF DESCRIPTION OF THE DRAWINGS

FIG. 3 shows a block diagram of a user plane protocol stack and a control plane protocol stack of an LTE system.

DESCRIPTION OF EXEMPLARY EMBODIMENTS

Figure 1:
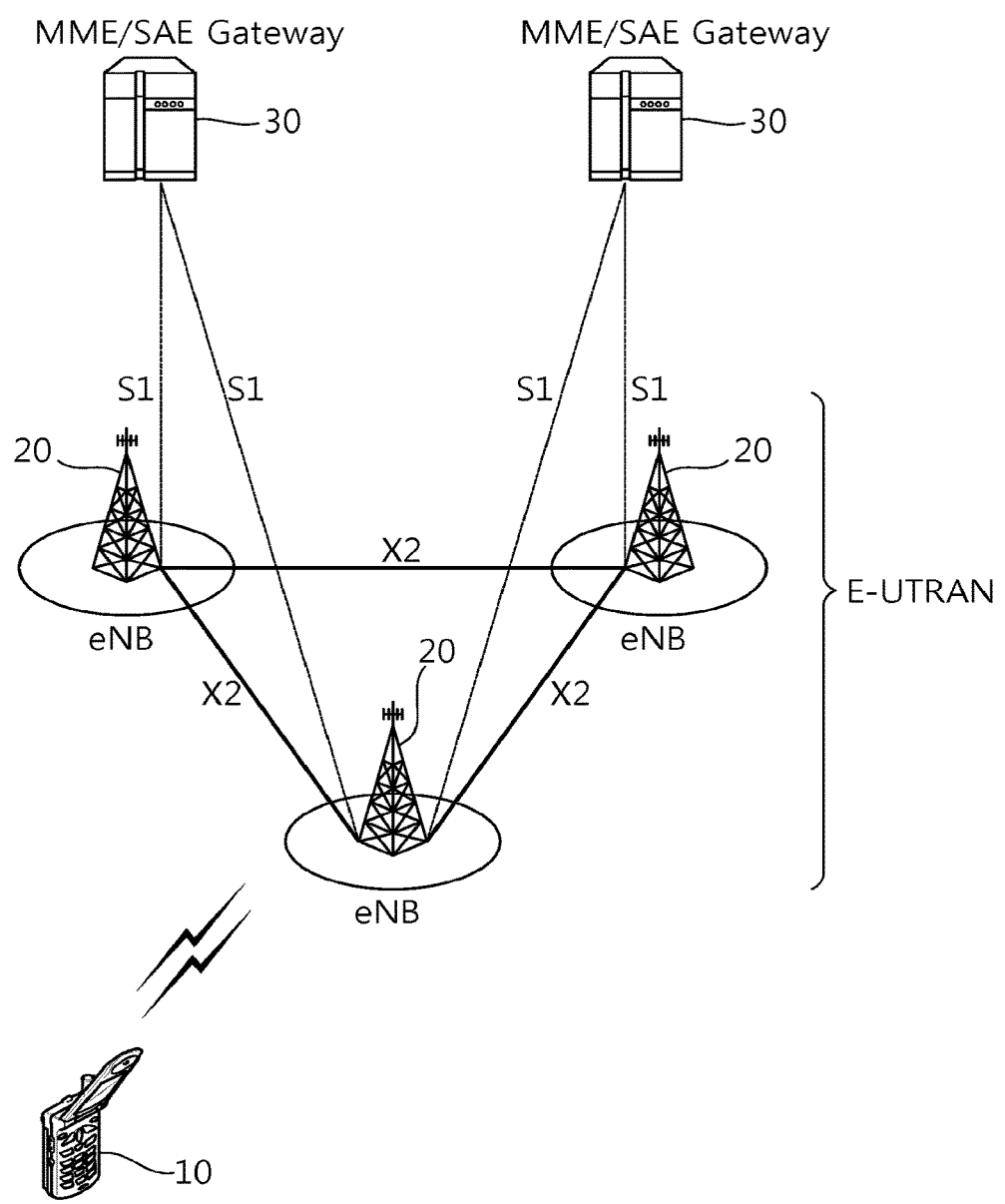
FIG. 1 shows LTE system architecture.
Figure 2:
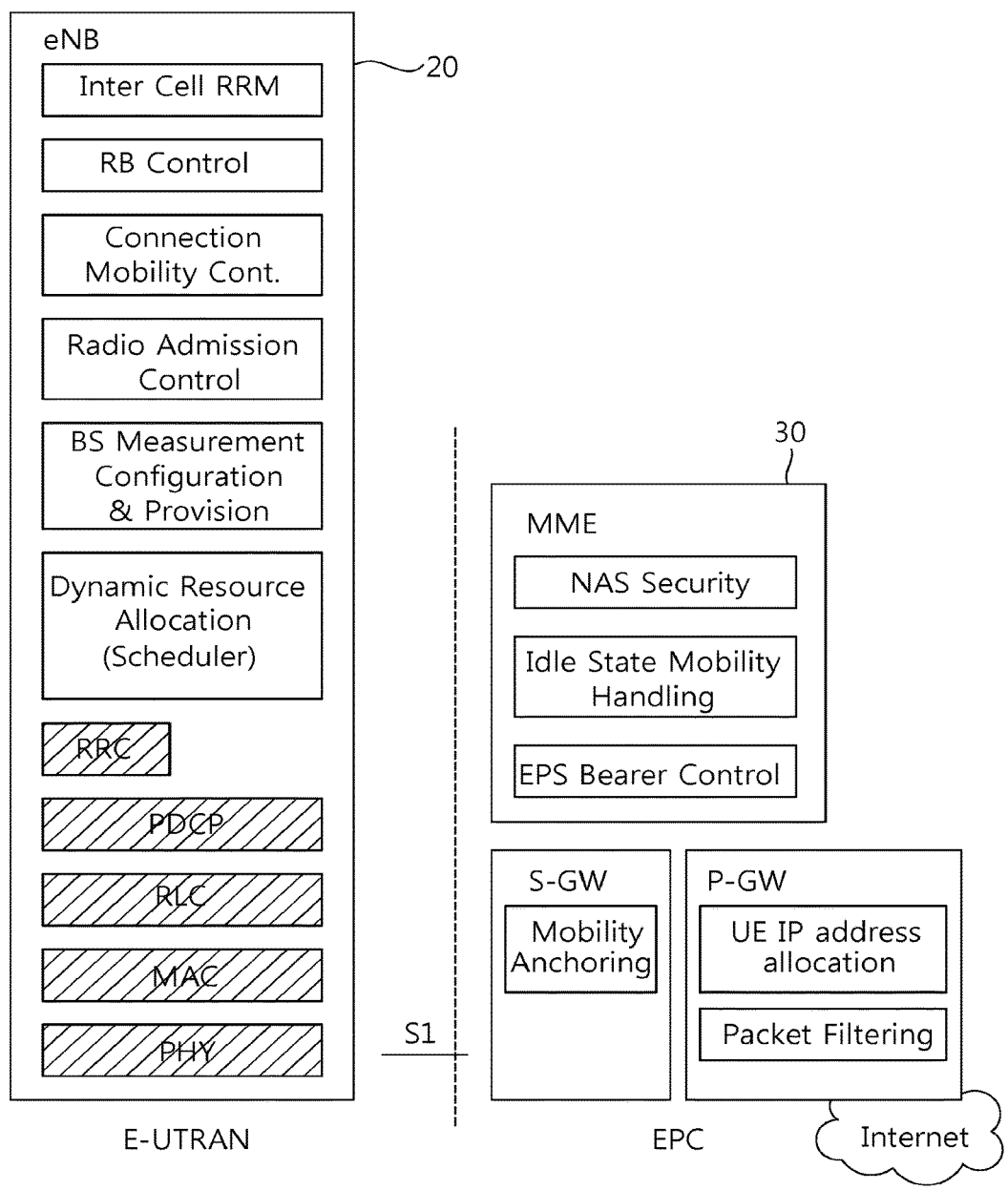
FIG. 2 shows a block diagram of architecture of a typical E-UTRAN and a typical EPC.
Figure 4:
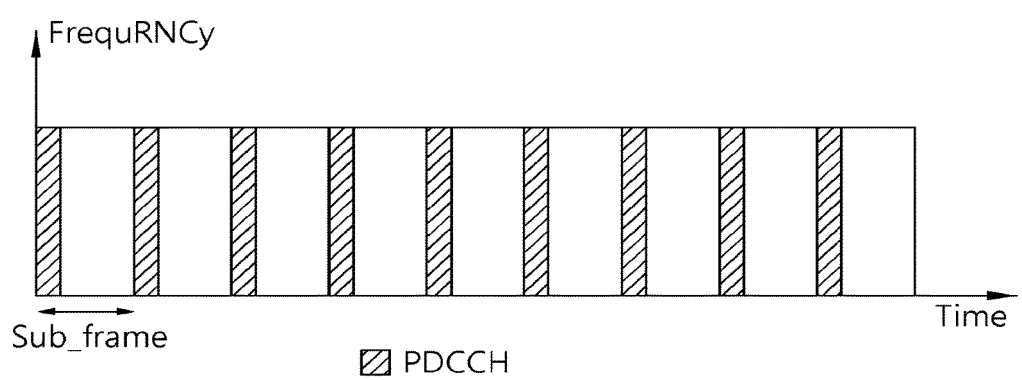
FIG. 4 shows an example of a physical channel structure.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

An active antenna system (AAS) refers to a base station (BS) equipped with an antenna array system, the radiation pattern of which may be dynamically adjustable. The AAS introduces an alternative antenna system from the one installed in the conventional BS. The interactions between the antenna array system and the transmitters and receivers within the AAS might be different from the conventional BS and the conventional antenna system.

AAS deployment scenarios are described. It may be referred to Section 5 of 3GPP TR 37.840 V12.0.0 (2013-03).

1) Tilt and Radiation Pattern Control

Antennas are usually manufactured with a fixed beamwidth, and antenna manufacturers typically offer a limited number of beamwidth variations within their conventional product lines. Conventional BS installations often introduce physical tilt to the antenna in order to orient the main lobe of the antenna response towards the ground. Antenna tilt is selected to optimize desired cell coverage and to minimize interference to and from adjacent cells. Some installations employ remote electrical tilt (RET) devices which allow adjustment of the phase shift to facilitate remote control of the antenna tilt angle.

An AAS may dynamically control the elevation and azimuth angles, as well as the beamwidth of its radiation pattern via electronic means. Electronic control may be used along with mechanical control. The AAS radiation pattern may be adapted to the specific deployment scenario and possibly to changing traffic patterns. The AAS radiation pattern may also be independently optimized for different links such as independently for uplink and downlink, for coverage and beam forming gain purposes.

The concepts of tilt and beamwidth control can be extended by a technique known as cell partitioning in which the cell is subdivided in vertical or horizontal directions by adjustment of the antenna pattern. For example, one cell partition is located close to the BS and the other cell partition is located farther away from the BS.

2) Multiple-Input Multiple-Output (MIMO)

MIMO is a general terminology that includes the various spatial processing techniques such as beamforming, diversity, and spatial multiplexing. Brief description of each is provided below.

Beamforming: The use of a dedicated beam formed towards the UE when data demodulation using a dedicated reference signal is supported by the UE.

Diversity: The use of diversity techniques to jointly optimize in the spatial and frequency domain through the use of, for example, spatial-frequency block code (SFBC) or frequency switching transmit diversity (FSTD), or combinations of both.

Spatial multiplexing: The transmission of multiple signal streams to one (SU-MIMO) or more (MU-MIMO) UEs using multiple spatial layers created by combinations of the available antennas.

3) Differentiated Antenna Behaviors at Different Carrier Frequencies

AAS supports the use of different antennas at different carrier frequencies and for different radio access technologies (RATs). For example, an AAS may create 4 virtual antennas for an LTE carrier and 2 antennas for a GSM or high-speed packet access (HSPA) carrier.

4) Per RB (or UE) Transmission and Reception

Each UE may get its own beam that tracks the movement of the UE. The current specification support for spatial multiplexing, beamforming and transmit diversity includes the ability to schedule transmission and reception to one UE within one resource block. This allows beamforming to individual UEs with adaptation to mobility, as an example.

The AAS BS can be deployed for wide area, medium range, and local area coverage.

The wide area coverage deployment scenario is typically found in outdoor macro environments, where the BS antennas are located on masts, roof tops or high above street level. An AAS BS designed for wide area coverage is called a macro AAS.

The medium range coverage deployment scenario is typically found in outdoor micro environments, where the AAS BSs are located below roof tops. An AAS BS designed for medium range coverage is called a micro AAS.

The local area BS deployment scenario is typically found indoors (offices, subway stations, etc.) where antennas are located on ceilings or walls. Deployment scenarios for local area coverage can also be found outdoors in hot spot areas like marketplaces, high streets or railway stations. An AAS BS designed for local area coverage is called a pico AAS.

The radiation pattern for an AAS BS can be dynamically adjustable, while a fixed beam pattern is assumed for the conventional BS. Coexistence of an AAS BS with a conventional BS based on an un-coordinated deployment shall be considered. Analytical approaches can be used to study the coexistence requirements based on existing results, supplemented with additional simulations when necessary. The following initial scenarios are identified for the purpose of studying the spatial characteristics for AAS BS:

E-UTRA macro AAS BS co-located with another E-UTRA macro AAS BS

E-UTRA macro AAS BS co-located with E-UTRA macro legacy BS

Based on the deployment/coexistence scenarios described above, the deployments scenarios of AAS may be categorized on three aspects as described in Table 1 below.

TABLE 1

| | Possible scenarios | Amount of development required further |
|---|---|---|
| Cell partitioning | split to two parts (inner area and outer area) | medium |
| | track the movement of each UE | high |
| Frequency and RAT assignment | identical frequency for all partition in a cell | medium |
| | different frequency for each partition | medium |
| | different RAT for each partition | high |
| Coexistence scenarios | macro AAS BS co-located with another macro AAS BS | medium |
| | macro AAS BS co-located with macro legacy BS | medium |

Referring to Table 1, related to the cell partitioning, splitting a cell to inner part and outer part is considered as a basic deployment scenario. If more accurate and adaptive beam steering is assumed, per UE transmission and reception by tracking each UE's movement would be possible scenario.

Related to frequency and RAT assignment for each cell partition, there are three possible options: 1) assigning an identical frequency for all partition, 2) different frequency for each partition, and 3) different RAT for each partition. Among three options, assigning different RAT for each partition may require more efforts in the network point of view than other options, e.g., inter-RAT handover, cell identifier (ID) allocation, and need more discussion about use cases.

Related to the coexistence scenarios, if the interworking SON mechanisms between AAS BSs co-located with each other are developed, then it can be used for the case of AAS BS co-located with legacy BS. However in this case the compatibility problems should be considered.

Therefore, it is preferable to focus on the following AAS deployment scenarios first.

splitting cell to inner area and outer area, assigning identical frequency for all partition in a cell or different frequency for each partition, and macro AAS BS co-located with another macro AAS BS.

Basic AAS deployment scenarios are described. For AAS actions that may be applied to optimize capacity in case of high UE concentration, scenarios including beam forming, cell shaping, and cell splitting have been discussed. The scenarios assume high traffic demand from high density of UEs. The UEs may be concentrated temporarily or permanently in space. The AAS-based deployment is used to optimize capacity.

Figure 5:
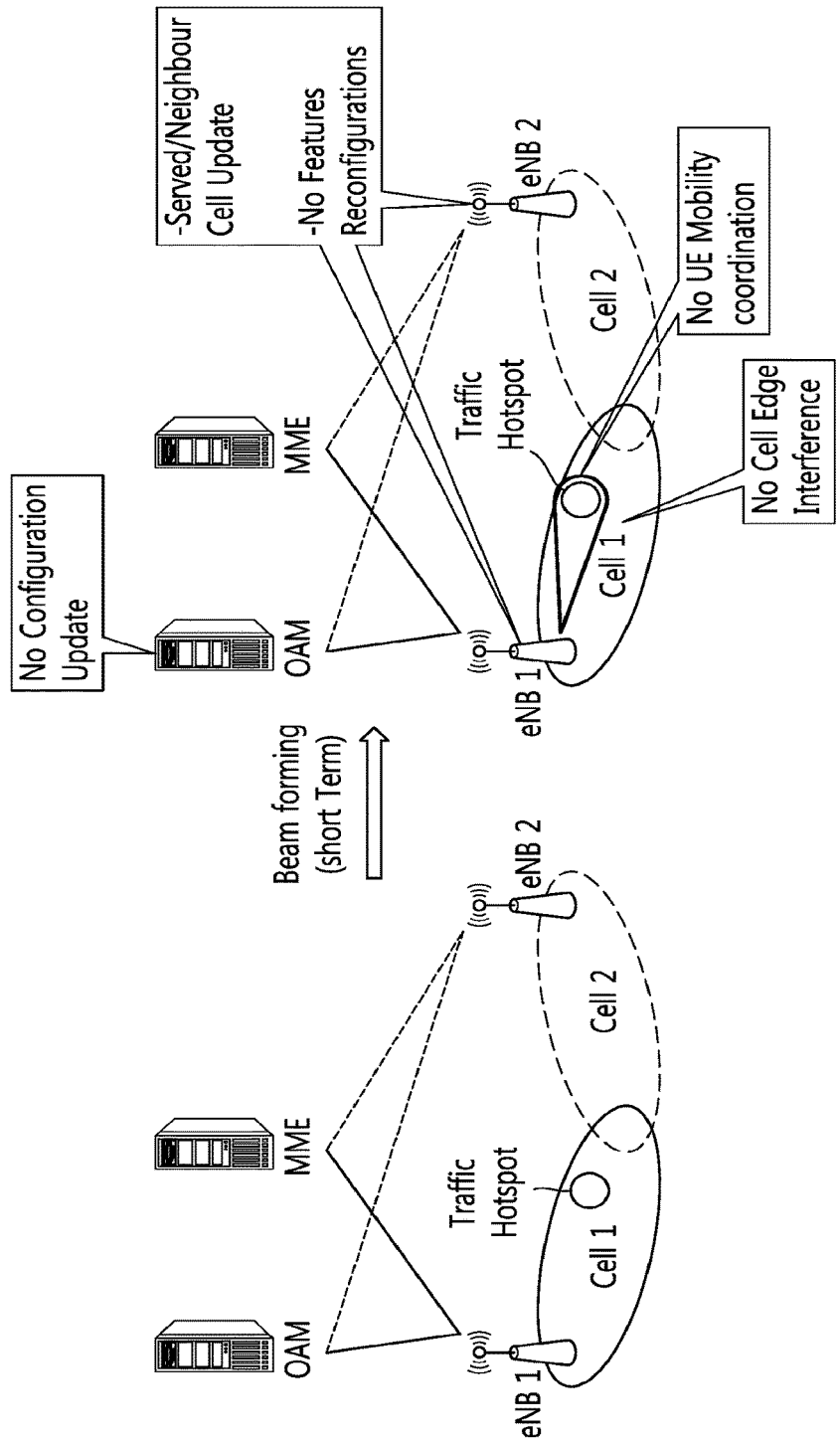
FIG. 5 shows a scenario of beam forming for adjustments for an AAS.

FIG. 5 shows a scenario of beam forming for adjustments for an AAS. The beam forming introduces adaptive or reconfigurable antenna systems, where the coverage of each cell is maintained unchanged. Referring to FIG. 5, the eNB 1 configures antennas towards traffic hotspot. There is no cell edge interference according to the beam forming, and there is no UE mobility coordination in the traffic hotspot. Further, there is no served/neighbor cell update and/or features reconfigurations in each eNB. Further, there is not configuration update in operations, administration and maintenance (OAM). The same physical cell identity (PCI) is used in all the cell coverage. These adjustments are considered to be on fast time scale (following radio resource management (RRM)). The trigger for the change may be OAM reconfiguration (e.g., based on collected key performance indicators (KPIs)) if beam forming results in re-shaping cell coverage or, if the cell coverage is not affected, the control unit is the base station (implementation based).

Figure 6:
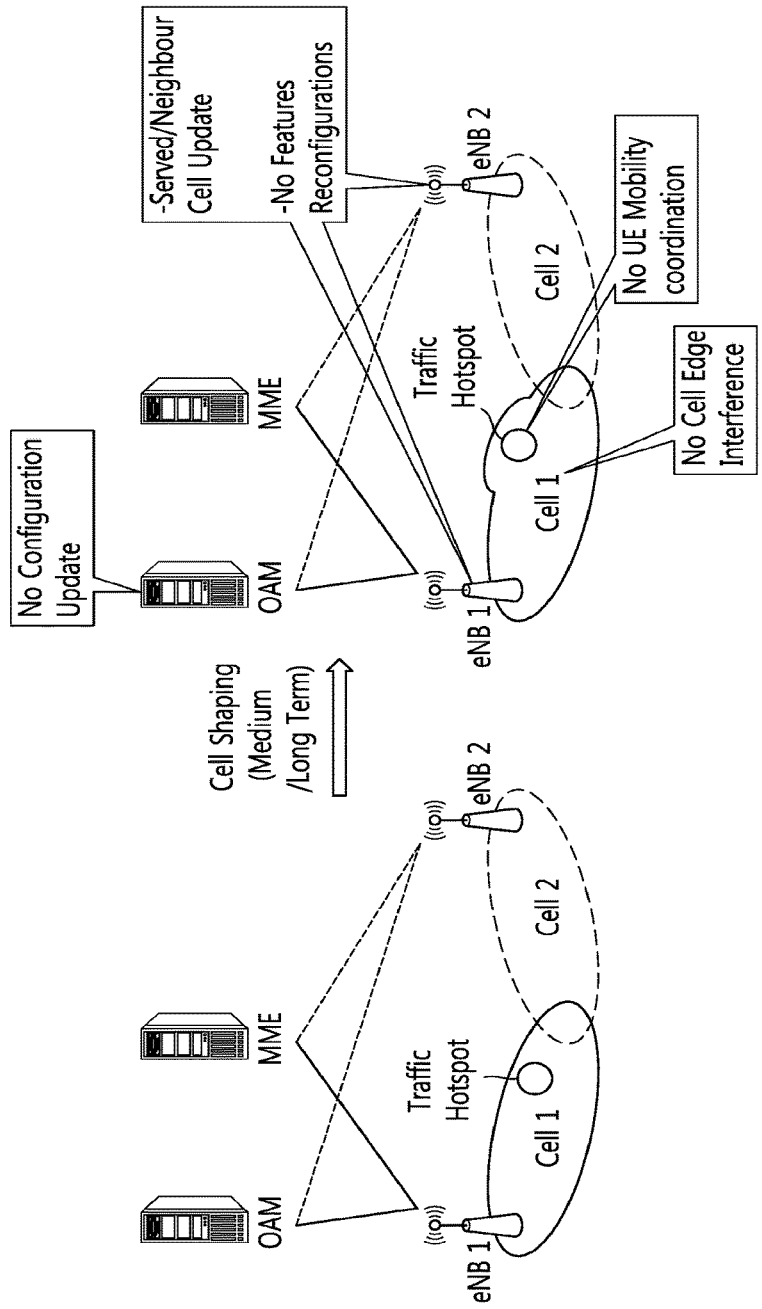
FIG. 6 shows a scenario of cell shaping for adjustments for an AAS.

FIG. 6 shows a scenario of cell shaping for adjustments for an AAS. The cell shaping introduces adaptive or reconfigurable antenna systems, where the main coverage of each cell is maintained unchanged but the cell edge can be adapted to load demand. Referring to FIG. 6, the cell 1 is shaped around traffic hotspot. There is no cell edge interference according to the cell shaping, and there is no UE mobility coordination in the traffic hotspot. Further, there is no served/neighbor cell update and/or features reconfigurations in each eNB. Further, there is not configuration update in OAM. The same PCI is used in all the cell coverage. These adjustments are considered to be on medium time scale (every 1 h or more seldom). The trigger for the change may be OAM reconfiguration (e.g., based on collected KPIs) or the control unit may be the base station (implementation based) if the change is pre-planned.

Figure 7:
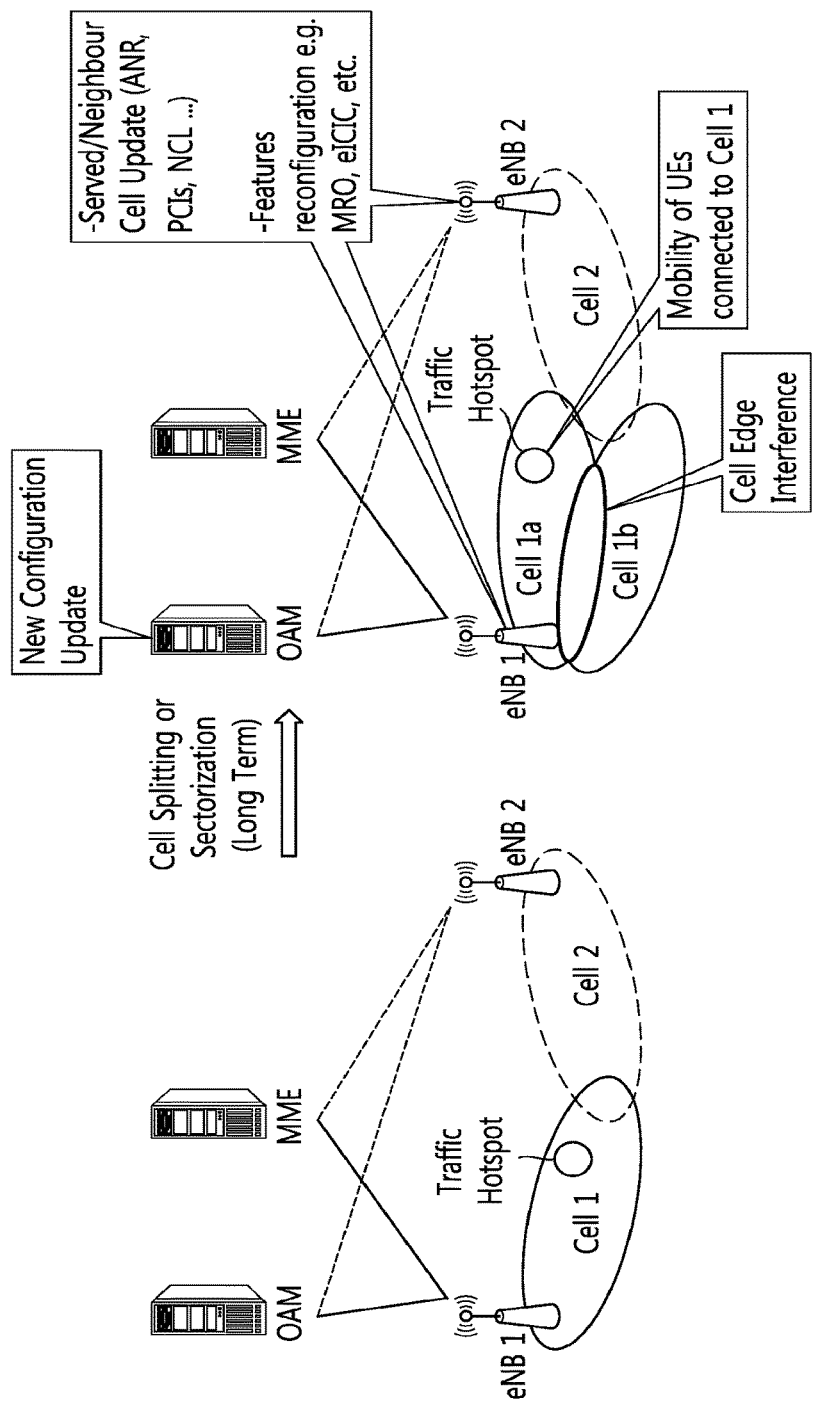
FIG. 7 shows a scenario of cell splitting for adjustments for an AAS.

FIG. 7 shows a scenario of cell splitting for adjustments for an AAS. The cell splitting adopts higher order sectorization (vertical, horizontal or a combination) to selected base stations by changing an antenna system to include more antenna beams, each covering a smaller area than before the change. However, the main coverage of the combined beams corresponds to the main cell coverage before the split. Referring to FIG. 7, the cell 1 is split into cell 1a and cell 1b in order to support traffic hotspot. Cell edge interference may occur between the cell 1a and cell 1b, and mobility of UEs connected to the cell 1 in traffic hotspot may be changed. Further, served/neighbor cell update, which includes automatic neighbor relation (ANR), PCIs, neighbor cell list (NCL), etc., and features reconfigurations, which include mobility robustness optimization (MRO), enhanced inter-cell interference coordination (eICIC), etc., may be performed in each eNB. Further, there may be new configuration update in OAM. Each of the beams broadcasts different PCI. Cell splitting procedures is considered on a long term time scale (every 1 h or more seldom—few times a day). The trigger for the change may be OAM reconfiguration (e.g., based on collected KPIs) or, if the cell coverage is not affected and the split is pre-planned, the control unit is the base station (implementation based). Indication of the cell splitting may be needed at OAM and neighbor eNBs.

Hereinafter, a scenario of cell shaping is focused according to an embodiment of the present invention.

Based on the approach describe above, there are some issues which require enhancements of the current specifications regarding the MRO mechanisms. That is, UE needs to distinguish cells supporting a cell shaping function by the AAS from normal cells because the cell shaping functions causes the change of cell coverage area dynamically. Even though the UE is handed over to the shaping part of a cell, the UE may have to leave the cell due to the dynamic change of cell coverage. Therefore when the eNB decides a handover of the UE, the eNB needs to know about whether the target cell supports the cell shaping function by the AAS or not.

Accordingly, according to an embodiment of the present invention, an eNB may indicate whether the cell supports a cell shaping function by the AAS or not. Upon receiving the indication, the serving eNB may know whether the neighbor cell, to which the serving eNB may handover the UE, supports the cell shaping function or not.

Figure 8:
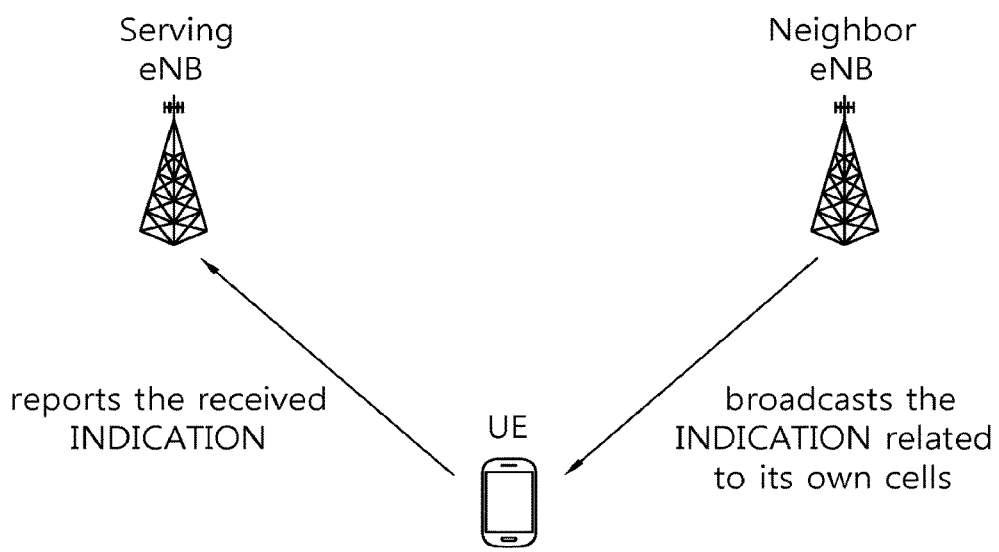
FIG. 8 shows an example of a method for transmitting an indication according an embodiment of the present invention.

FIG. 8 shows an example of a method for transmitting an indication according an embodiment of the present invention. Referring to FIG. 8, the neighbor eNB broadcasts the indication related to its own cells to UEs via a radio channel. Then, upon receiving the indication, the UE reports the received indication to the serving eNB. Accordingly, the serving eNB may know whether the neighbor cell supports the cell shaping function or not.

Figure 9:
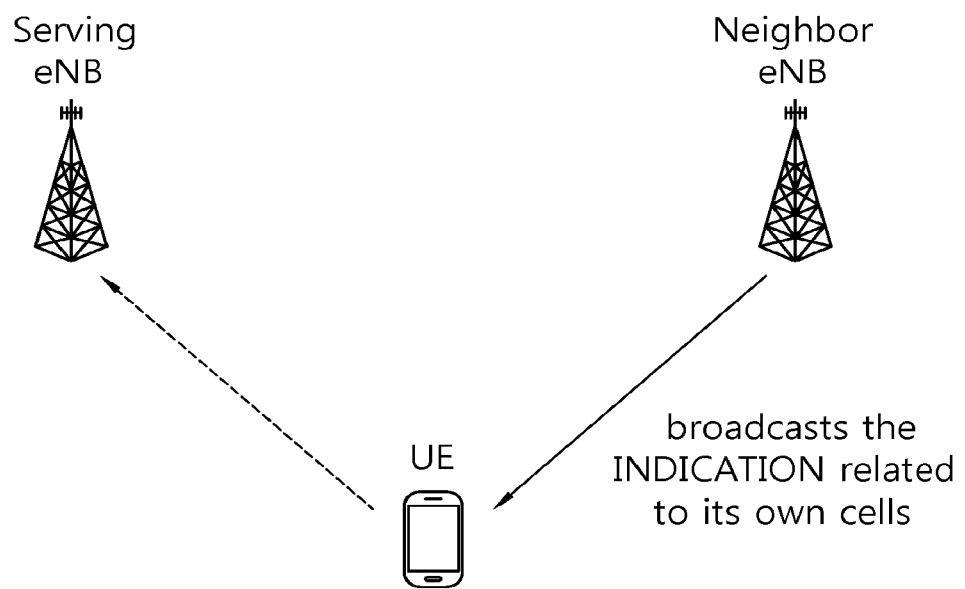
FIG. 9 shows another example of a method for transmitting an indication according an embodiment of the present invention.

FIG. 9 shows another example of a method for transmitting an indication according an embodiment of the present invention. Referring to FIG. 9, the neighbor eNB broadcasts the indication related to its own cells to UEs via a radio channel. If the received indication includes information that the neighbor cell is supporting the cell shaping function by the AAS, then the UE does not report measurement results to the serving eNB. Accordingly, the UE cannot be handed over to the neighbor cell.

Figure 10:
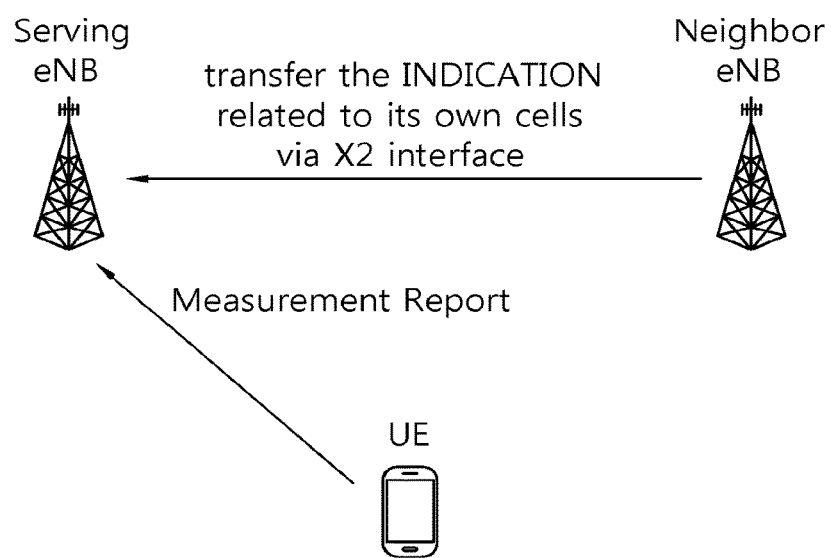
FIG. 10 shows another example of a method for transmitting an indication according an embodiment of the present invention.

FIG. 10 shows another example of a method for transmitting an indication according an embodiment of the present invention. Referring to FIG. 10, the neighbor eNB transmits the indication related to its own cells to the serving eNB of the UE via the X2 interface. Accordingly, the serving eNB may know whether the neighbor cell supports the cell shaping function or not.

The serving eNB may consider the indication, which is obtained from the UE or the neighbor eNB, when it decides whether to handover the UE to the cell related to the indication or not.

Further, according to an embodiment of the present invention, PCIs for cells supporting the cell shaping function by the AAS may be reserved. The eNB may broadcast the reserved PCI range information to its neighbor eNBs. Table 2 shows an example of allocation of PCIs for the cells supporting the cell shaping function by the AAS according to an embodiment of the present invention. For example, if the operator reserves K+1 PCIs for the cells supporting the cell shaping function by the AAS, the example of PCI assignment may be as follows.

TABLE 2

| PCI | 0 1 2 3 4 5 6 7 8 9 10 11 . . . | N N + 1 N + 2 N + 3 . . . N + K | . . . 499 500 501 502 503 |
|---|---|---|---|
| cells | PCI range for normal cells | PCI range for the cells supporting the cell shaping function by AAS | PCI range for normal cell. |

Referring to Table 2, PCIs from N to N+K are reserved for the cells supporting the cell shaping function by the AAS, and the remaining PCIs are reserved for the normal cells. PCIs reserved for the cells supporting the cell shaping function by the AAS and PCIs reserved for the normal cells do not overlap.

Further, according to an embodiment of the present invention, when a cell (cell 1) is in the heavy traffic load status, the eNB (eNB 1) managing the cell 1 may request its neighbor eNB (eNB 2) to shape a cell (cell 2) of the neighbor eNB toward the cell 1 in order to accept UEs of cell 1.

Figure 11:
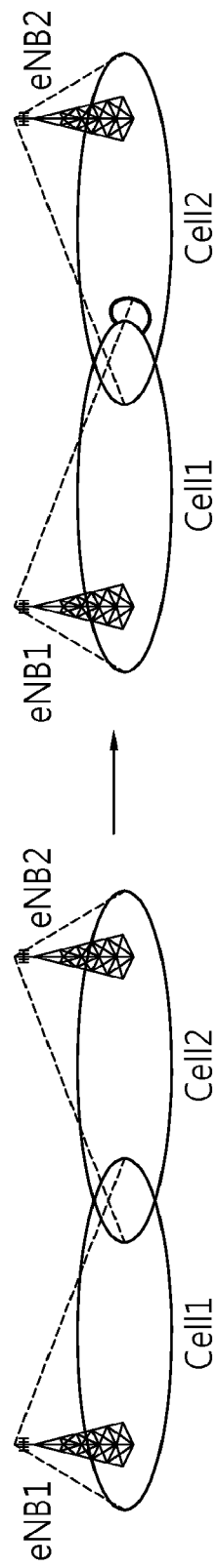
FIG. 11 shows an example of a cell shaping operation among neighbor eNBs.

FIG. 11 shows an example of a cell shaping operation among neighbor eNBs. Referring to FIG. 11, the cell 1 managed by the eNB1 is shaped towards the cell 2 managed by the eNB 2 at the edge of the cell. Main coverage of the cell 1 is unchanged. By shaping the cell 1 towards the cell 2 and accepting UEs of the cell 2, if the amount of the required traffic (or, the number of UEs) in the cell 2 is high, the eNB 2 can escape from the heavy load status. Moreover, if the cell 1 is in the heavy load status, it is possible that the eNB 2 shapes the cell 2 towards the cell 1 and accepts UEs of the cell 1.

The problem is that the practical cell coverage before the cell shaping would be different with the coverage area after the cell shaping. Therefore, if the eNB plans for the cell shaping or the cell un-shaping of its cells, it should notify neighbor cNBs of its plan. Alternatively, the eNB should announce neighbor eNBs the event that its cells have completed the cell shaping or the cell un-shaping. Hereinafter, the cell shaping means that the main coverage of the cell is maintained unchanged but the cell edge can be adapted to load demand. The cell un-shaping means that that the shaping cell goes back to the original status. That is, the cell shaping may be an operation from FIG. 11-(a) to FIG. 11-(b), and the cell un-shaping may be an operation from FIG. 11-(b) to FIG. 11-(a).

Figure 12:
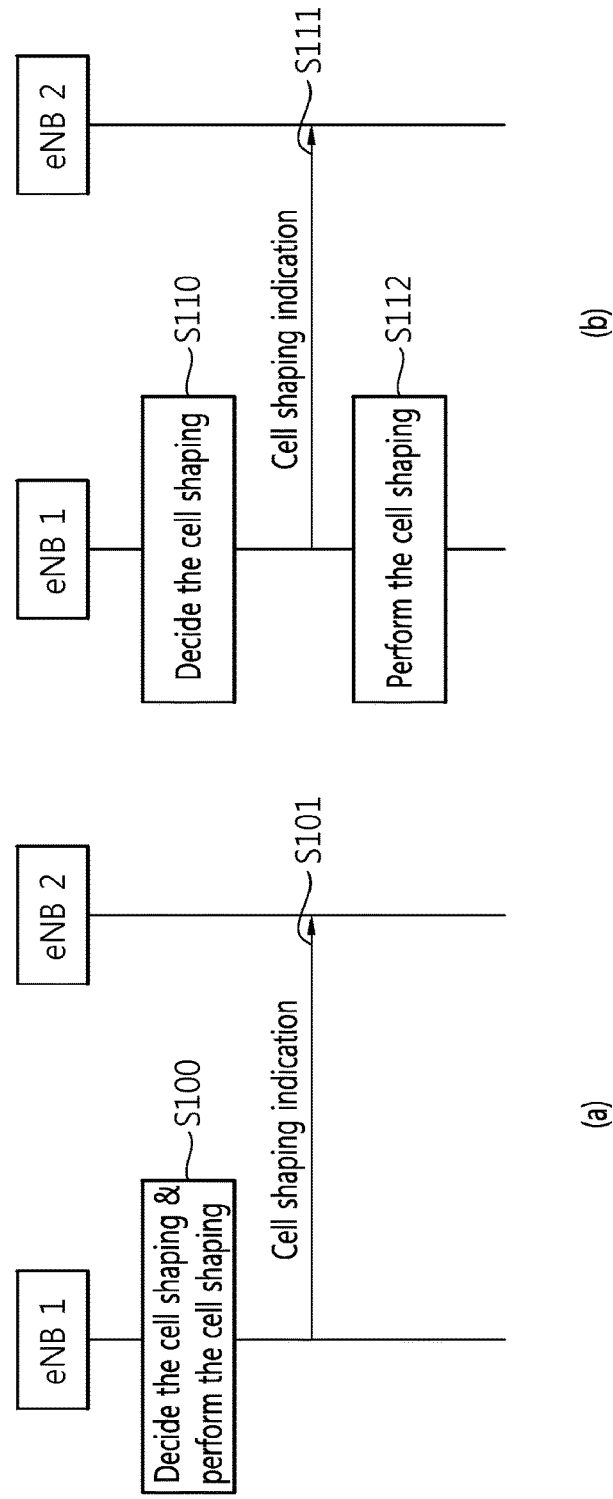
FIG. 12 shows an example of a method for transmitting a cell shaping indication according to an embodiment of the present invention.

FIG. 12 shows an example of a method for transmitting a cell shaping indication according to an embodiment of the present invention.

Referring to FIG. 12-(a), in step S100, the eNB1 decides to perform cell shaping of a cell and performs the cell shaping of the cell. In step S101, the eNB1 transmits a cell shaping indication which indicates that the eNB1 has performed the cell shaping of the cell. Accordingly, the eNB1 may inform the eNB2 the event that the eNB1 completed to the cell shaping of the cell.

Referring to FIG. 12-(b), in step S110, the eNB1 decides to perform cell shaping of a cell. In step S111, the eNB1 transmits a cell shaping indication which indicates that the eNB1 will perform the cell shaping of the cell. Accordingly, the eNB1 may inform the eNB2 the plan of the cell shaping of the cell after making the cell shaping decision. In step S112, the eNB1 performs the cell shaping of the cell.

Figure 13:
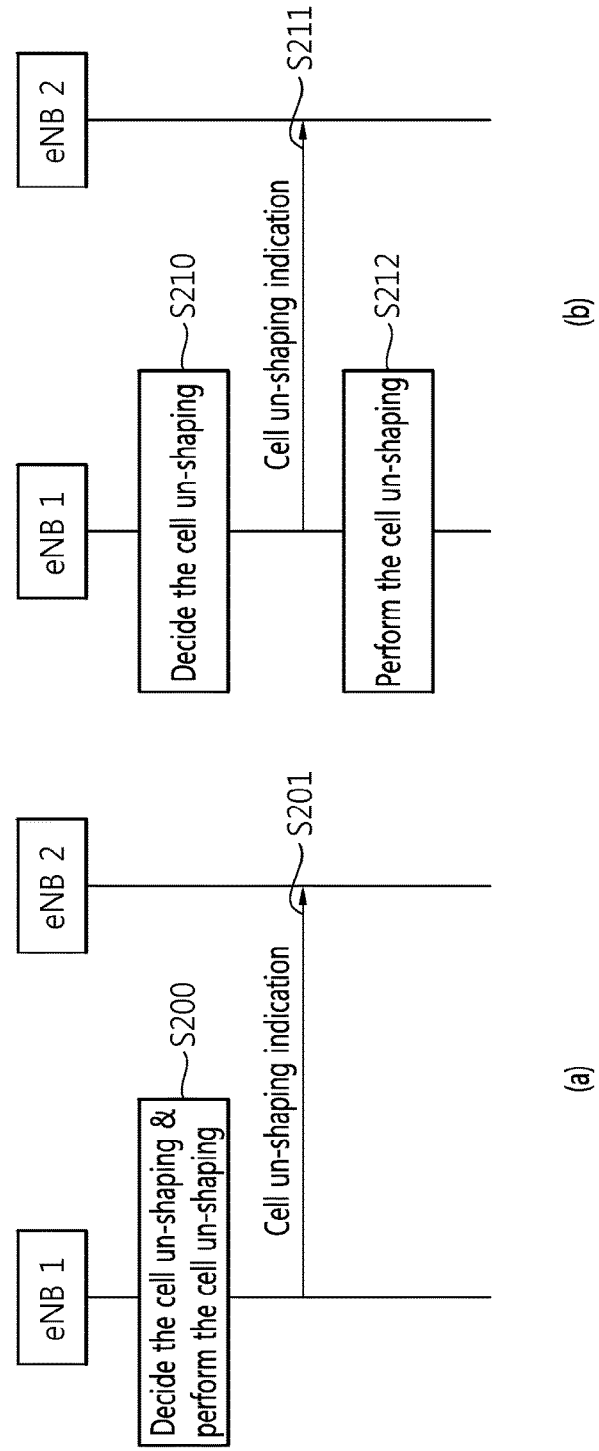
FIG. 13 shows an example of a method for transmitting a cell un-shaping indication according to an embodiment of the present invention.

FIG. 13 shows an example of a method for transmitting a cell un-shaping indication according to an embodiment of the present invention.

Referring to FIG. 13-(a), in step S200, the eNB1 decides to perform cell un-shaping of a cell and performs the cell un-shaping of the cell. In step S201, the eNB1 transmits a cell un-shaping indication which indicates that the eNB1 has performed the cell un-shaping of the cell. Accordingly, the eNB1 may inform the eNB2 the event that the eNB1 completed to the cell un-shaping of the cell.

Referring to FIG. 13-(b), in step S210, the eNB1 decides to perform cell un-shaping of a cell. In step S211, the eNB1 transmits a cell un-shaping indication which indicates that the eNB1 will perform the cell un-shaping of the cell. Accordingly, the eNB1 may inform the eNB2 the plan of the cell un-shaping of the cell after making the cell un-shaping decision. In step S212, the eNB1 performs the cell un-shaping of the cell.

Moreover, right after an eNB decides to the cell un-shaping of its cell, if the eNB receives the HANDOVER REQUEST message from its neighbor eNB, then the eNB needs to reject the handover request in order to prevent a handover failure, and inform the appropriate rejection cause to its neighbor eNB.

Figure 14:
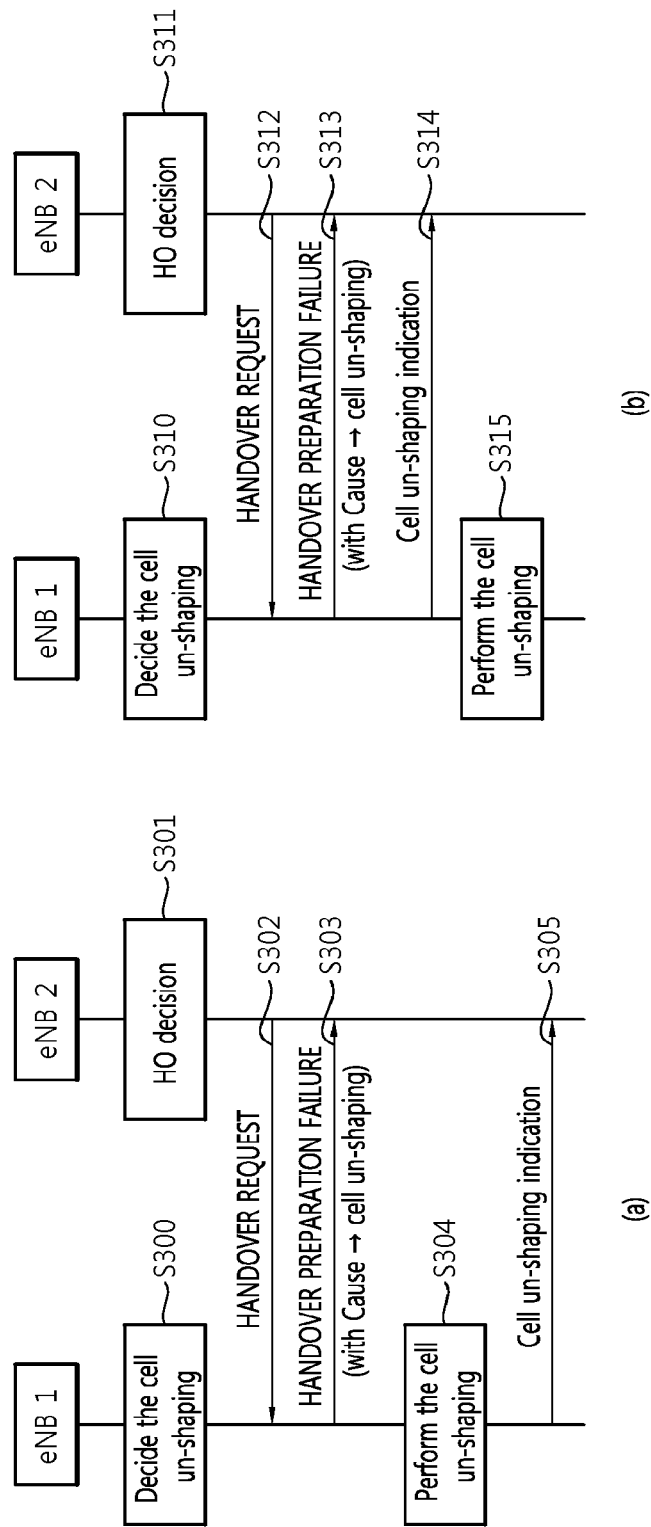
FIG. 14 shows an example of a method for rejecting a handover procedure according to an embodiment of the present invention.

FIG. 14 shows an example of a method for rejecting a handover procedure according to an embodiment of the present invention.

Referring to FIG. 14-(a), in step S300, the eNB1 decides to perform cell un-shaping of a cell. In step S301, the eNB2 decides a handover, and accordingly, in step S302, the eNB2 transmits the HANDOVER REQUEST message to the eNB1. That is, the eNB1 receives the HANDOVER REQUEST message from the eNB2 right after the eNB1 decided to perform the cell un-shaping of the cell. Therefore, in step S303, the eNB1 transmits the HANDOVER PREPARATION FAILURE message to the eNB2 with the cause information to indicate that the target cell (e.g., cell of the eNB1) has the plan of the cell un-shaping. In step S304, the eNB1 performs the cell un-shaping of the cell. In step S305, the eNB1 transmits a cell un-shaping indication which indicates that the eNB1 has performed the cell un-shaping of the cell. Accordingly, the eNB1 may inform the eNB2 the event that the eNB1 completed to the cell shaping of the cell.

Referring to FIG. 14-(b), in step S310, the eNB1 decides to perform cell un-shaping of a cell. In step S311, the eNB2 decides a handover, and accordingly, in step S312, the eNB2 transmits the HANDOVER REQUEST message to the eNB1. That is, the eNB1 receives the HANDOVER REQUEST message from the eNB2 right after the cNB1 decided to perform the cell un-shaping of the cell. Therefore, in step S313, the eNB1 transmits the HANDOVER PREPARATION FAILURE message to the eNB2 with the cause information to indicate that the target cell (e.g., cell of the eNB1) has the plan of the cell un-shaping. In step S314, the eNB1 transmits a cell un-shaping indication which indicates that the eNB1 will perform the cell un-shaping of the cell. Accordingly, the eNB1 may inform the eNB2 the plan of the cell shaping of the cell after making the cell shaping decision. In step S315, the eNB1 performs the cell un-shaping of the cell.

Figure 15:
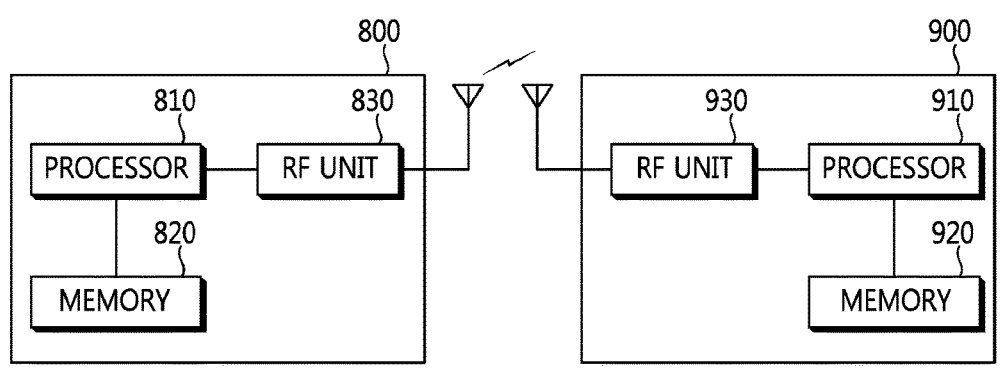
FIG. 15 shows a wireless communication system to implement an embodiment of the present invention.

FIG. 15 shows a wireless communication system to implement an embodiment of the present invention.

A first eNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a first base station, a handover preparation failure message in a wireless communication system, the method comprising:
    determining whether to perform a coverage modification of a cell, managed by the first base station, in an active antenna system (AAS);
    receiving a handover request message from a second base station after determining to perform the coverage modification of the cell; and
    transmitting the handover preparation failure message, including cause information indicating the coverage modification of the cell, to the second base station, when the handover request message is received after determining to perform the coverage modification of the cell.

2. The method of claim 1 further comprising:
    performing the coverage modification of the cell, managed by the first base station, in the AAS; and
    transmitting, the second base station, a coverage modification indicator indicating coverage of the cell has been modified or a plan to modify the coverage of the cell,
    wherein the coverage modification indicator indicating that the coverage of the cell has been modified is transmitted to the second base station after the coverage modification of the cell is performed, and
    wherein the coverage modification indicator indicating the plan to modify the coverage of the cell is transmitted to the second base station before the coverage modification of the cell is performed.

3. The method of claim 2, wherein the coverage modification is performed by cell shaping, wherein a main coverage area of the cell remains unchanged and an edge of the cell is adapted to load demand.

4. The method of claim 2, wherein the coverage modification is performed by cell un-shaping, wherein the first base station returns a modified shape of the cell to its original shape.

5. A first base station transmitting a handover preparation failure message in a wireless communication system, the base station comprising:
    a memory;
    a transceiver; and
    a processor, operatively connected to the memory and the transceiver, wherein the processor is configured to:
    determine whether to perform a coverage modification of a cell, managed by the first base station, in an active antenna system (AAS),
    control the transceiver to receive a handover request message from a second base station after determining to perform the coverage modification of the cell, and
    control the transceiver to transmit the handover preparation failure message including cause information indicating the coverage modification of the cell, to the second base station, when the handover request message is received after determining to perform the coverage modification of the cell.

6. The first base station of claim 5, wherein the processor is further configured to:
    perform the coverage modification of the cell, managed by the first base station, in the AAS, and
    control the transceiver to transmit, to the second base station, a coverage modification indicator indicating coverage of the cell has been modified or a plan to modify the coverage of the cell,
    wherein the coverage modification indicator indicating that the coverage of the cell has been modified is transmitted to the second base station after the coverage modification of the cell is performed, and
    wherein the coverage modification indicator indicating the plan to modify the coverage of the cell is transmitted to the second base station before the coverage modification of the cell is performed.

7. The first base station of claim 6, wherein the coverage modification is performed by cell shaping, wherein a main coverage area of the cell remains unchanged and an edge of the cell is adapted to load demand.

8. The first base station of claim 6, wherein the coverage modification is performed by cell un-shaping, wherein the first base station returns a modified shape of the cell to its original shape.

* * * * *